(12) United States Patent
Myasnikov et al.

(10) Patent No.: US 10,256,598 B2
(45) Date of Patent: Apr. 9, 2019

(54) METHOD AND DEVICE FOR STABILIZATION OF OPTICAL POWER AND SPECTRAL LINE OF RADIATION BY MODE LOCKED ULTRA-SHORT PULSE FIBER LASER

(71) Applicant: IPG PHOTONICS CORPORATION, Oxford, MA (US)

(72) Inventors: Daniil Myasnikov, Oxford, MA (US); Ilya Bychkov, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/738,310

(22) PCT Filed: Jun. 30, 2016

(86) PCT No.: PCT/US2016/040401
§ 371 (c)(1),
(2) Date: Dec. 20, 2017

(87) PCT Pub. No.: WO2017/004376
PCT Pub. Date: Jan. 5, 2017

(65) Prior Publication Data
US 2018/0191125 A1    Jul. 5, 2018

Related U.S. Application Data

(60) Provisional application No. 62/234,338, filed on Sep. 29, 2015.

(30) Foreign Application Priority Data

Jun. 30, 2015  (RU) ................................ 2015125953

(51) Int. Cl.
*H01S 3/11*      (2006.01)
*H01S 3/067*     (2006.01)
(Continued)

(52) U.S. Cl.
CPC ........ *H01S 3/1109* (2013.01); *H01S 3/06791* (2013.01); *H01S 3/10061* (2013.01);
(Continued)

(58) Field of Classification Search
CPC .. H01S 3/1109; H01S 3/1305; H01S 3/10061; H01S 3/06791; H01S 3/137
See application file for complete search history.

(56) References Cited

U.S. PATENT DOCUMENTS 6,400,737 B1 *   6/2002   Broutin ................. H01S 5/0687
                                                              372/20
2006/0182153 A1 *  8/2006   Liu ........................ H01S 3/067
                                                              372/6

* cited by examiner

*Primary Examiner* — Dung Nguyen
(74) *Attorney, Agent, or Firm* — Yuri B. Kateshov, Esq.; Timothy J. King, Esq.

(57) ABSTRACT

The disclosed method and apparatus for stabilizing a mode-locked regime of a fiber ring oscillator based on a NPR include tapping a portion of light, which has a broad spectral bandwidth, from a fiber ring resonator into at least first and second control channels. The control channels are configured to guide respective first and second fractions of the tapped portion. One of the control channels is provided with a bandpass filter operative to extract a region from the broad spectral bandwidth. The fractions with respective full spectral bandwidth and region thereof are then evaluated in a central processing unit which is operable to generate a control signal if a predetermined criterion is not met. The control signal is received by one or more polarization controller units operative to dynamically modulate a state of polarization of light in the fiber ring resonator until the evaluation meets the predetermined criterion.

13 Claims, 1 Drawing Sheet

(51) Int. Cl.
*H01S 3/13* (2006.01)
*H01S 3/136* (2006.01)
*H01S 3/10* (2006.01)
*H01S 3/137* (2006.01)

(52) U.S. Cl.
CPC .......... *H01S 3/1112* (2013.01); *H01S 3/1305* (2013.01); *H01S 3/136* (2013.01); *H01S 3/137* (2013.01)

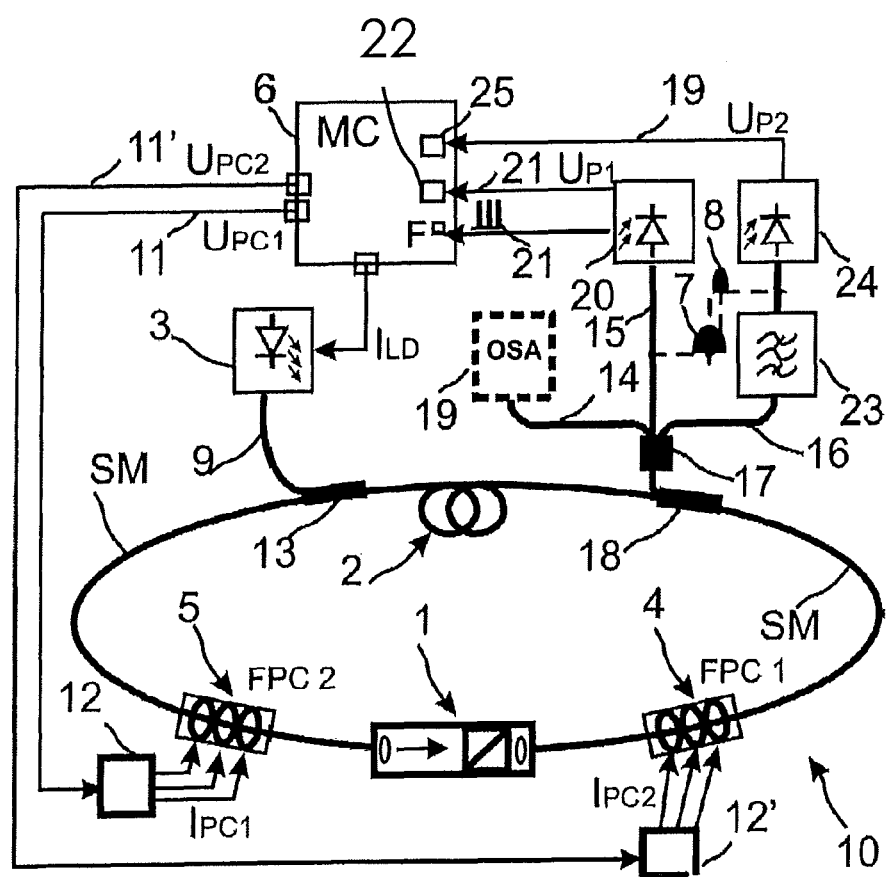

METHOD AND DEVICE FOR STABILIZATION OF OPTICAL POWER AND SPECTRAL LINE OF RADIATION BY MODE LOCKED ULTRA-SHORT PULSE FIBER LASER

CROSS-REFERENCE TO RELATED APPLICATIONS

This application is continuation of Russian Patent Application having the Reg. No. 2015125953 and filed with the FIPC on Jun. 30, 2015.

BACKGROUND OF THE DISCLOSURE

Field of the Disclosure

The invention relates to passive mode-locked ring fiber laser based on a non-linear polarization rotation (NPR) architecture. In particular, the invention relates to the mode-locked ring fiber laser provided with a control scheme which is operative to monitor and control the optical power and spectrum of ultrashort optical pulses in real time so as to maintain the ring fiber laser in a stable mode locked regime.

Discussion of the Known Art

Solid state femtosecond lasers are successfully used in a variety of industrial and research applications. Among various configurations of solid state femtosecond lasers, fiber lasers are more compact, simple, reliable and efficient than lasers based on bulk components.

Particularly important to the scope of this disclosure is the NPR-based mode lock mechanism associated with a fiber oscillator which has a ring resonant cavity. Well known to one of ordinary skill, the fiber ring laser of this type generally includes a gain medium, i.e., a length of fiber doped with rare earth elements, polarization sensitive isolator, and two polarization controllers flanking the isolator. All of these components are optically interconnected with one another to define a ring resonant cavity which has positive or negative or all-normal dispersion segments.

In the passively mode-locked ring laser based on the NPR, the polarization controller is operable to optimize the polarization such that the peak of the pulse travels through the polarizing isolator. As a consequence of NPR, the center of the pulse acquires a different polarization than its wings. Therefore, the isolator shortens the pulses by acting, in conjunction with this rotation mechanism, as an artificial fast saturable absorber.

As known to one of ordinary skill in the laser art, a ring fiber oscillator based on the NPR has the following advantages:

Relatively simple structure;

Various operational regimes depending on total cavity dispersion, resonator length and fiber type;

Generation of ultrashort broadband pulses of about 100 fs and shorter at 1.06, 1.55 and 1.9 nm central wavelengths which correspond to respective ytterbium (Yb), erbium (Er) and thulium (Tm) emission peaks; and Self-start.

However, this laser configuration has a serious drawback—sensitivity to external stresses and, as a consequence, unstable pulse generation. As known to one of ordinary skill in the art, this instability is caused by external thermal and mechanical stresses leading to birefringent fluctuation process which may change the phase relation between orthogonally polarized field components. The disturbed phase relationship tends to increase optical losses and eventual loss of the mode locked regime which in general is characterized by a number of pulses, bandwidth, central wavelength and pulse energy. Hence the stability of mode synchronization in this type of lasers depends on a feedback loop and its operation based on the electronic control of polarization controllers.

One of the possible configurations of a ring cavity fiber laser is disclosed in U.S. Pat. No. 7,477,665 ('665). The disclosed cavity includes a fiber doped with ions of Er, optical pump energizing the Er fiber through WDM 980/1550 nm multiplexer, two optical polarization controllers, polarization sensitive isolator between the controllers and output coupler. In operation, a small percentage of signal is tapped from the output coupler to be detected by a photodiode and is further converted into frequency dependent signal components including:

A direct current (DC) component (in between consecutive pulses in a pulse generating regime), which corresponds to a continuous mode of operation of the cavity characterized by a narrow spectral line radiation at a central 1550 nm wavelength;

An alternating high frequency component correlated to the mode locking operation with a pulse repetition rate (equal to $1/\tau$, where $\tau$ is the time taken for the light to make one round trip of ring resonator) in a 20 to 100 Mhz range with a spectral line width of about 20 nm and pulse duration of about 200 fs; and A relaxation low frequency component related to the stability of the mode-locking status; this component is detected in a 50-100 kHz frequency range and also depends from the DC component.

At a start-up stage of the disclosed laser, the electronic control loop is operative to analyze the presence of the above discussed three components and alter the polarization state of at least one polarization controller such that the DC component is decreased to the lowest value, while the other two components tend to increase. Once the relaxation component becomes stable and since the relaxation and alternating components are correlated, an optimal mode locking operational stage of the laser is achieved with uniformly shaped femtosecond pulses.

In operation, the bandwidth, including a central frequency, of laser emitted pulses tends to shift. If this undesired phenomenon is not controlled, the ring laser eventually stops operating in a mode-locked regime. Yet the '665 patent does not anticipate such a possibility and therefore the disclosed in this reference control means are not configured to deal with this problem and thus cannot adjust the pulse bandwidth. Since the duration of a pulse is inversely proportional to a spectral width of the pulse, i.e., the shorter the pulse the broader the spectral width and conversely, the '665 patent clearly does not disclose a structure capable of controlling the duration of pulses either.

Another mode synchronization method for a mode locked ring laser is disclosed in KR20120058275 teaching an automatic feedback loop-based control scheme which is operative to process a sub-region of the entire pulse spectrum. The sub-region to be processed is located outside a pass-band of photodiode integrated into the feedback loop. The disclosed system is not operative to adjust the pulse bandwidth and thus pulse duration in a mode locked regime.

A need therefore exists for a mode-locked fiber ring oscillator based on NPR which has a control feedback loop which is configured to monitor and control a bandwidth of pulse so as to maintain the desired bandwidth essential for the stable mode locked operation of the oscillator.

SUMMARY OF THE DISCLOSURE

These needs are satisfied by the disclosed fiber ring cavity oscillator based on NPR technique and method of using it for generating ultrashort pulses. Conceptually, the stable mode-lock operation of the disclosed oscillator is provided by monitoring and controlling the spectral characteristics of pulses. With the controllable average output power, the fine-tuning of the disclosed mode-locked oscillator outputting a train of ultrashort pulses with the desired spectral width at a given central wavelength is realized by automatically adjusting the measured spectral width, and hence the pulse duration.

In a broad aspect of the disclosure, the inventive mode locked fiber ring oscillator based on a NPR is configured with a unidirectional fiber ring resonator that includes a plurality of polarization controllers, and a feedback control loop. The feedback control loop is configured with a central processing unit (CPU) receiving two signals of a portion of resonator-circulating light which is tapped from the resonator. One of the signals corresponds to the power of the tapped light with a full spectral width having a central fundamental wavelength, whereas the other represents the power corresponding to a filtered region of the entire spectral which does not include the central wavelength. The CPU is operative to process the coupled signals and determine if the result of processing meets the predetermined criteria. If the criterion is not met, the CPU outputs a control signal coupled into at least one of the polarization controllers. The latter is operative to dynamically change the polarization state of the circulating light in response to the control signal until the evaluation of the full spectral width and its region meets the desired criterion which is indicative of stable output power and broad spectrum of output pulses.

In a second aspect of the disclosure, the fiber ring oscillator of the first aspect has the resonator provided with an output pigtailed coupler which is configured to tap the portion of light further guided by respective fiber channels, such as a plurality of single mode passive fibers, towards the controller. In addition, the resonator includes a unidirectional optical isolator.

In a third aspect of the disclosure, the fiber ring resonator of either of the above disclosed aspects or any possible combination of these aspects, includes a bandpass filter coupled into one of the fiber channels. The bandpass filter is operative to extract and pass a region of the full spectrum which does not include the fundamental frequency of continuous wave (CW) radiation.

A fourth aspect of the disclosure relates to a plurality of pigtailed optoelectronic converters of the feedback loop as disclosed in any of the aspects and any combination of these aspects. The converters are coupled into respective fiber channels and operative to convert the received light into an electric signal which is coupled into the controller.

Each of the above-disclosed aspects or any possible combination of them also includes a plurality of analog-digital and digital-analog converters operative to convert signal into the desired format.

In a further aspect of the disclosure discussed in each of the above aspects or any possible combination thereof, the feedback loop has an additional fiber channel receiving the tapped light. This fiber channel is configured with an optical spectral analyzer (OSA) operative to measure and display the distribution of power of the received tapped light over a specified wavelength span by displaying power in the vertical scale and the wavelength in the horizontal scale. During the startup, while increasing the pump power of laser medium's pump, the disclosed laser first starts emitting a CW radiation which can be seen on the OSA as a narrow spectral line. After a certain threshold, the laser switches to the pulsed regime characterized by a broad spectrum. Depending on the pump power, one can see both types of spectrum. Preferably, the disclosed fiber ring resonator operates exclusively in the regime with the broad spectrum.

The disclosed fiber ring laser of any of the above discussed individual aspects or any combination of these aspects is further configured with an optical pump energizing a laser medium while being placed outside the resonator. The laser medium is a length of fiber, which is part of the ring resonator, doped with any known rare earth ions and a combination of different ion types. The pump may have different configuration including, for example, diode lasers or fiber lasers.

In accordance with a further aspect of the disclosure, the inventive method of stabilizing a mode-locking regime of a fiber ring laser based on NPR includes tapping a portion of light circulating within the ring resonator, guiding the tapped light through a plurality of fibers, evaluating electrical signals representing the full spectrum of the tapped light and its region with respective reference values, and controlling a polarization controller such that the comparison between electrical signals with respective reference values meets the predetermined criterion.

BRIEF DESCRIPTION OF THE DRAWING

The above and other features will become more readily apparent from the single FIGURE which illustrates the inventive ultra-short pulse fiber ring oscillator utilizing a NPR mode-locking technique.

SPECIFIC DESCRIPTION

The disclosed ring oscillator 10 is configured with an optical isolator 1, a length of laser medium 2 (active fiber), which is energized by a diode laser 3, and two all fiber polarization controllers 4 and 5. The stability of broad linewidth pulses is provided by a feedback mechanism configured with multiple optical and electrical control channels and a CPU 6.

In operation, an optical power P1 of the entire spectral bandwidth 7 and an optical power P2 of its region 8, not including the central frequency of the continuous generation, are determined by respective optoelectronic converters 20 and 24. The detectors output electrical signals $U_{P1}$ and $U_{P2}$, representing respective powers P1 and P2, which are coupled into CPU 6 through respective channels 21 and 19' of the feedback loop. The CPU 6 is operative to compare signals $U_{P1}$ and $U_{P2}$ to respective reference values which are specified to represent the desired spectral bandwidth. If the compared values do not match or differ from one another more than the predetermined minimum, CPU 6 outputs control signals—six in the shown schematic—Upc1 and Upc2 which are guided along respective electrical channels 11 and 11' to drivers 12 and 12' of polarization fiber controllers 4 and 5, respectively. One of or both drivers 12 and 12' are operative to dynamically change a polarization state of the circulating light providing minimal deviation of powers P1 and P2 from respective reference values or match there between in order to provide a stable pulsed regime.

As a rule, an electronically controlled polarization controller is configured with two or three plates each having a thickness which depends on the applied signal that can be either a voltage signal or current signal. The polarization controllers 4, 5 may have a fiber design which uses a polarization maintaining (PM) fiber. The drivers 12' and 12 control respective polarization controllers 4 and 5 by outputting current signals Ipc1 and Ipc2 each guided to the polarization controller through three (3) electrical channels. The three current signals, for example, are coupled into respective resistive heaters (not shown) each of which is operative to thermally affect a designated phase plate. It is understood that all types of known polarization controllers including, but not limited, to fiber based, volume plates based, crystal based polarization controllers and etc., may be utilized within the scope of this invention The ring oscillator 10 starts with applying a current signal Ild to the input of a pump, such as a diode laser 3, in response to a command from CPU 6. The diode laser 3 emits pump light which is guided through a passive single mode fiber 9 to an input fiber coupler 13. Thereafter, the pump light is coupled into laser medium 2 thereby energizing the latter. Six arbitrary control currents—three for each polarization controller 12, 12', if both polarization controllers are involved—are selected from a predetermined range and coupled into respective polarization controllers until the regime of ultrashort pulses is established. Note that, for example, polarization controller 12', converting the state of polarization of light within the fiber ring resonator into elliptical, may be replaced with a PM fiber which is spliced to the output of polarization controller 12 at a desired angle providing the elliptical polarization, provided the rest of components of the fiber ring resonator have a PM configuration.

The detection of the continuous and pulsed regimes is based on the generated radiation circulating in the ring resonator. In particular, output coupler 18 taps a portion of circulating light from the resonator. The tapped portion of light is further split into at least three fractions of light guided through respective optical channels 14, 15 and 16 of fiber splitter 17. Each of the optical channels has its specific configuration.

In particular, optical channel 14 includes an optical spectrum analyzer (OSA) 19 which may conclusively show the current regime state of the resonator. For example, during a start-up of the resonator, the OSA shows a narrow spectral line of continuous generation. As laser 10 enters into a pulsed regime, the DC signal gradually decreases while a signal representing a pulse repletion rate increases which is characteristic of the close to mode-locked regime.

Once the pulsed regime prevails, the fractions guided in respective channels 14-16, of course, has the same spectral bandwidth. While channels 15 and 16 have respective optoelectronic controller 20, 24, channel 16 is additionally configured with a spectral filtering component, such as bandpass filter 23 upstream from optoelectronic converter 24. Accordingly, light coupled into optoelectronic converter 20 has the entire spectral bandwidth, whereas light coupled into optoelectronic converter 24 is characterized only by a region of the entire spectral bandwidth.

The optoelectronic converters 20 and 24 convert respective fraction of light with full and red bandwidths to continuous analog (voltage) signals Up1 and Up2, respectively. The amplitudes of respective voltage signals are proportional to respective average optical powers of the two fractions of light and are further coupled into CPU 6 via respective analog digital converters 22 and 25. Additionally, a train of electrical pulses is coupled into a pulse counter input F of CPU 6 operative to count the number of pulses.

The CPU 6 is operative to process the received digital signals. Particularly, CPU 6 stores reference values which correspond to desired average powers Po1 and Po2, respectively, representing the desired spectral bandwidth. The reference values are compared to receive respective digital signals. If the results of the comparison do not meet predetermined criteria, CPU 6 adjusts currents of respective converters 20 and 24 (or one of them) by outputting control signals UPc1 and UPc2 coupled into respective polarization controllers. The criteria may be selected from a predetermined minimal deviation of the measured signal from the stored value. The controlled signals are continuously output by CPU 6 until the average power and bandwidth of the ultrashort pulses correspond to respective parameters representing the desired spectral bandwidth.

The disclosed fiber ring oscillator is operative to generate pulses with a pulse duration in a sub-nanosecond range. For example, the pulse duration may lie in a femto-picosecond range. The pulse repetition rate depends from the length of the ring resonator and varies in a 10-100 MHz range.

The laser medium 2 is doped with ions of rare-earth and/or transition metals. Preferably, the mode-locked regime is stabilized when the radiation bandwidth at a −3 dB level lies within a 10-30 nm wavelength range centered around the desired central wavelength of the laser radiation which depends on the type of dopants.

The bandpass filter 23 may be configured with a passband varying between 2 and 3 nm. Preferably, optoelectronic converters 20 and 24 each operate to convert a train of optical pulses of the tapped light to a DC voltage signal with the amplitude proportional to the optical power.

Also, it is preferable that optoelectronic converters 20 and 24 each have a comparator. This feature allows the conversion of ultra-short optical pulses to discreet electrical signals which are coupled into CPU 6 operative to count the number of pulses.

The CPU 6 outputs electrical signals for controlling polarization controllers 12 and 12' that may be voltage or current signals are preferably formed so as to minimize their possible change.

The fiber ring oscillator 10 may have one or more bandpass filters in addition to filter 23. The additional passband filters may have respective sub-bands covering different regions of the entire spectral bandwidth.

The inventive oscillator 10 successfully underwent a battery of preliminary tests. One of concrete implementations of the resonator includes a single mode (SM) erbium fiber (EDFC-980-HP) having a 1.8 m length; SM F28 passive fiber used for the ring resonator; PSC-15-0-0 fiber polarization controllers; input coupler 13 configured as a WDM 980/1550; 10% output coupler 18; fiber distributor 17 splitting light which is received from output coupler 18 so that fiber channels 15 and 16 each guide 1% of this light; optoelectronic converters 20 and 24 configured as InGaAs photodiodes; fiber passbands r 23 at 1567 nm wavelength with a 3 nm linewidth; and CPU 6 of C8051F125 series.

The test results show that the disclosed fiber ring oscillator after being calibrated by means of CPU 6 operates in a stable pulsed regime with a pulse repetition rate of 25 MHz, full spectral width centered at 1.55 nm wavelength of about 19 nm and output power of pump 3 in a 150-200 mW.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein.

The invention claimed is:

1. A mode locked broadband ultrashort light pulse fiber oscillator based on a nonlinear polarization rotation (NPR) of light comprising:
 a unidirectional fiber ring resonator operative to generate a train of ultrashort light pulses each having a broad range of frequencies, the fiber ring resonator including at least one light polarization controller unit; and
 an optoelectronic control feedback loop receiving a portion of light, which is tapped off from the ring resonator, and having at least first, second and one or more third control channels, the first control channel receiving a first unfiltered fraction of the tapped portion with the broad range of frequencies, the second control channel receiving a second filtered fraction of the tapped portion with a narrow range of frequencies which is filtered from within the broad range, the control feedback loop being configured to evaluate the received first unfiltered and second filtered fractions and output a control signal if a predetermined criterion is not met, wherein the one polarization controller unit receives the control signal and, in response thereto, is operative to change a state of polarization of the ultrashort light pulses circulating within the fiber ring resonator so that the criterion is met,
the one third control channel receiving a third unfiltered fraction of the tapped portion in parallel to the first and second controlled channels, the third channel including an optical spectrum analyzer operative to process the received third fraction and determine relative strengths of respective DC and high frequency components in the third unfiltered fraction, with the high frequency component corresponding to a pulse repetition rate and indicative of a mode-locked regime.

2. The mode locked ultrashort pulse fiber oscillator of claim 1, wherein the optoelectronic control feedback loop further comprises:
 first and second optoelectronic converters coupled into respective first and second control channels, the first and second optoelectronic converters being configured to convert the respective first unfiltered and second filtered fractions of the tapped light portion into respective DC voltage signals,
 a central processing unit (CPU) operative to receive the DC voltage signals and compare them with respective reference values, wherein if the comparison does not meet the predetermined criterion, the CPU outputs a control signal coupled into the one polarization controller unit which dynamically changes the state of polarization of the light circulating within the fiber ring resonator until the predetermined criterion is met; and
 at least one or more bandpass optical filters coupled to respective second and additional control channels.

3. The mode locked ultrashort pulse fiber oscillator of clam 2, wherein the predetermined criterion includes a preset difference between amplitudes of the received DC voltage signals, which are proportional to respective powers of the first unfiltered and second filtered fractions of the tapped portion, and respective reference values representing a desired spectral bandwidth.

4. The mode locked ultrashort pulse fiber oscillator of clam 2, wherein the at least one of or the first and second optoelectronic converters include respective comparators operative to generate discreet electrical signals which are coupled into the CPU operative to count the coupled electrical signals.

5. The mode locked ultrashort pulse fiber oscillator of claim 1, wherein the fiber ring resonator is further configured with lengths of respective single mode active and passive fibers optically coupled in line with the one polarization controller unit, a unidirectional optical isolator coupled in line with the one polarization controller unit, an input fiber wavelength-division multiplexer (WDM) optically coupled to the active fiber, and an output fiber coupler tapping the portion of light from the fiber ring resonator which is split among the control channels.

6. The mode locked ultrashort pulse fiber oscillator of claim 5 further comprising an optical pump generating pump light which is coupled into the active fiber, the optical fiber being doped with ions selected from rare earth metals, transition metals and a combination of these metals.

7. The mode locked ultrashort pulse fiber oscillator of claim 1, wherein the optoelectronic control feedback loop further comprises a driver of the one polarization controller unit which receives the control signal and is operative to output a plurality of current signals coupled into the one polarization controller unit.

8. The mode locked ultrashort pulse fiber oscillator of clam 2, wherein the optoelectronic control feedback loop is further configured with a multiplicity of additional control channels each including an additional bandpass spectral filter which is operative to extract another narrow region from within the broad region of frequencies different from that extracted in the second control channel, the bandpass filters each having a 2-3 nm passband, wherein the ultrashort light pulses at a desired central wavelength each have the spectral bandwidth in a 10 to 30 nm range.

9. The mode locked ultrashort pulse fiber oscillator of claim 1, wherein the fiber ring resonator is all PM fiber ring resonator which further comprises a second polarization controller unit or a specifically oriented polarization maintaining fiber for converting the state of polarization of light in the fiber ring resonator to elliptical, and an additional driver for the second polarization controller unit.

10. A method of stabilizing a mode-locked regime of a fiber ring oscillator based on a NPR, comprising:
 tapping a portion of light having a broad range of frequencies, which define a broad spectral bandwidth, from a fiber ring resonator into first, second and one or more third control channels which guide respective fractions of the tapped portion;
 extracting a region from the spectral bandwidth of the fraction guided in the first control channel while continuing to guide another fraction unfiltered along the second control channel;
 evaluating the filtered and unfiltered fractions;
 generating a control signal if the evaluation does not meet a predetermined criterion;
 dynamically modulating a state of polarization of light in the fiber ring resonator in response to the control signal until the evaluation of the filtered and unfiltered fractions meets the predetermined criterion indicative of desired uniform power and broad spectral bandwidth of output ultrashort pulses; and
 determining a strength of DC and high frequency components of the tapped portion of light in the third control channel, wherein the high frequency component represents a pulse repetition rate of the output ultrashort pulses which increases while the DC component decreases when the fiber ring resonator operates in a pulsed regime.

11. The method of stabilizing the mode-locked regime of claim 10 further comprising measuring spectral bandwidths of respective unfiltered and filtered fractions and converting results of the measurement into respective DC voltages.

12. The method of stabilizing the mode-locked regime of claim 10, wherein the evaluation includes comparing the filtered and unfiltered fractions with respective reference values such that a difference therebetween is within a predetermined range.

13. The method of stabilizing the mode-locked regime of claim 10, wherein the fiber ring resonator is configured with a plurality of polarization maintaining fiber components and includes a single polarization maintaining unit.

* * * * *